United States Patent

[11] 3,571,639

| [72] | Inventor | Janis Tiltins<br>Cleveland, Ohio |
|---|---|---|
| [21] | Appl. No. | 715,355 |
| [22] | Filed | Mar. 22, 1968 |
| [45] | Patented | Mar. 23, 1971 |
| [73] | Assignee | TRW Inc,<br>Cleveland, Ohio |

[54] DUAL-SECTION BRUSHLESS ALTERNATOR
6 Claims, 5 Drawing Figs.

[52] U.S. Cl. ................................................ 310/168,
310/112, 310/263
[51] Int. Cl. ................................................ H02k 17/42
[50] Field of Search ........................................ 310/168,
263, 156, 155, 165, 166, 112

[56] References Cited
UNITED STATES PATENTS
3,173,042 3/1965 Fodor ........................... 310/112

| 3,223,866 | 12/1965 | Tiltins ........................ | 310/168 |
| 3,223,916 | 12/1965 | Shafranek .................. | 310/168 |
| 3,309,547 | 3/1967 | Woodward .................. | 310/168 |
| 3,321,652 | 3/1967 | Opel ........................... | 310/168 |

*Primary Examiner*—J. D. Miller
*Assistant Examiner*—R. Skudy
*Attorney*—Hill, Sherman, Meroni, Gross & Simpson ABSTRACT: A dual-section brushless alternator having a cylindrical housing of magnetic material with two annular stators and with direct current excitation windings between the magnetic end sections of the housing and the stators and between the two stators. In one embodiment a common polyphase alternating current winding is wrapped about both stators, while in another embodiment, two separate polyphase windings are on the respective stators and energize respective diode networks whose outputs are added to provide a relatively high direct current output voltage.

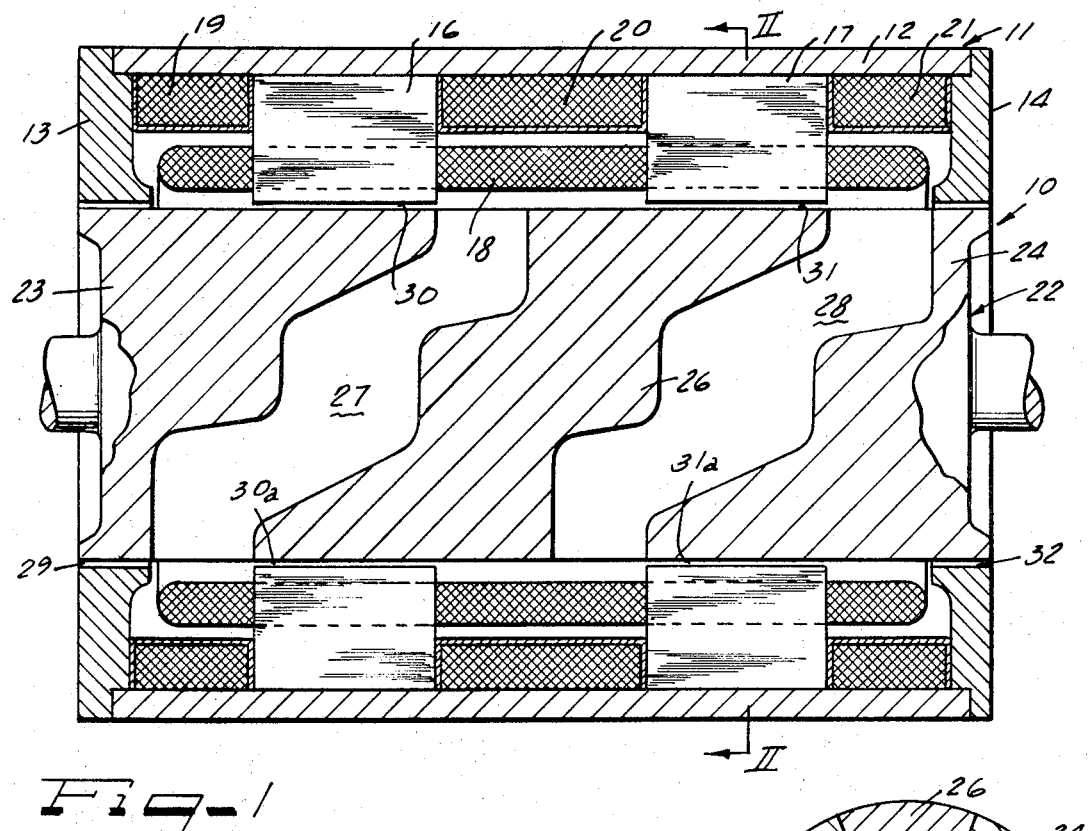
Fig-1
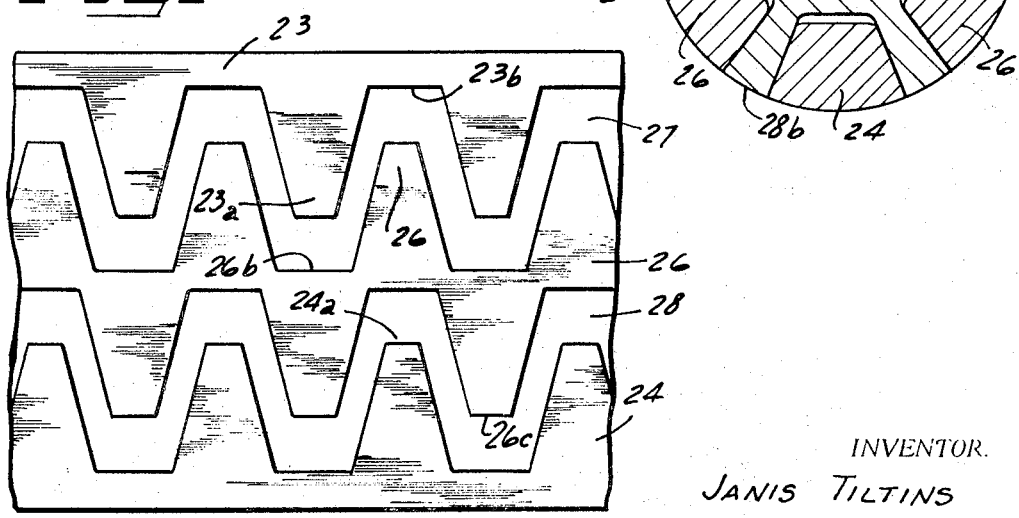
Fig-2
Fig-3
INVENTOR.
JANIS TILTINS
BY Hill, Sherman, Meroni, Gross & Simpson
ATTORNEYS

INVENTOR.
JANIS TILTINS 3,571,639

DUAL-SECTION BRUSHLESS ALTERNATOR

BACKGROUND OF THE INVENTION

1. Field of the Invention

This invention relates to brushless alternators and is more particularly directed to improved brushless alternators for applications requiring maximum reliability at high operating temperatures and high rotor shaft speeds.

2. Description of the Prior Art

Heretofore, employment of the brush and wound rotor type alternators was unsatisfactory for applications such as nuclear power conversion systems, nuclear powered satellites, missiles, aircraft and the like, primarily because of the high shaft speed requirements and the high rotor temperatures produced at such speeds. The design of an alternator of this type satisfactorily meeting the power demands for such applications normally resulted in units of prohibitive weight.

SUMMARY OF THE INVENTION

By employment of the present invention, wherein the requirements for brushes and rotor windings are eliminated from the alternator configuration, I substantially eliminate the problems and difficulties of the prior art and provide alternator units satisfactorily meeting the requirements for nuclear power systems, satellite, missile and related applications.

It is therefore an object of the present invention to provide brushless alternators capable of producing high rotor speeds.

It is another object of the present invention to provide brushless alternators without rotor windings permitting employment of the alternator rotor at high speeds.

It is still another object of the present invention to provide brushless alternators operable at high rotor speeds and high operating temperatures.

It is a further object of the present invention to provide brushless alternators wherein the field coil or permanent magnet means are located in the alternator housing thereby facilitating the removal of heat and resulting in minimum operating temperature.

It is still a further object of the present invention to provide brushless alternators which are operable under space and other extraterrestrial conditions including the lack of atmospheric contaminants.

It is another object of the present invention to provide brushless alternators having windingless rotors permitting the employment of rotor shafts of variable diameter thereby substantially reducing the critical speed problems encountered in the design of high-speed alternators.

Yet another object of the present invention is to provide a brushless alternator which can produce high-power outputs without exceeding stress limits imposed by high levels of the shaft speed of the alternator.

A still further object of the present invention is to provide a dual-section brushless alternator which can produce approximately twice the power output as brushless alternators of the prior art while only slightly increasing the weight of the alternator.

These and other objects, features and advantages of the present invention will become more apparent from a careful consideration of the following detailed description, when considered in conjunction with the accompanying drawings, wherein like reference numerals and characters refer to like and corresponding parts throughout the several views.

BRIEF DESCRIPTION OF THE DRAWINGS

FIG. 1 is a view in longitudinal section of a preferred embodiment of the present invention;

FIG. 2 is a cross section of the armature shown in FIG. 1 taken along lines II—II;

FIG. 3 is a developed elevational view of the surface of the rotor of FIG. 1;

DESCRIPTION OF THE PREFERRED EMBODIMENTS

Figure 4:
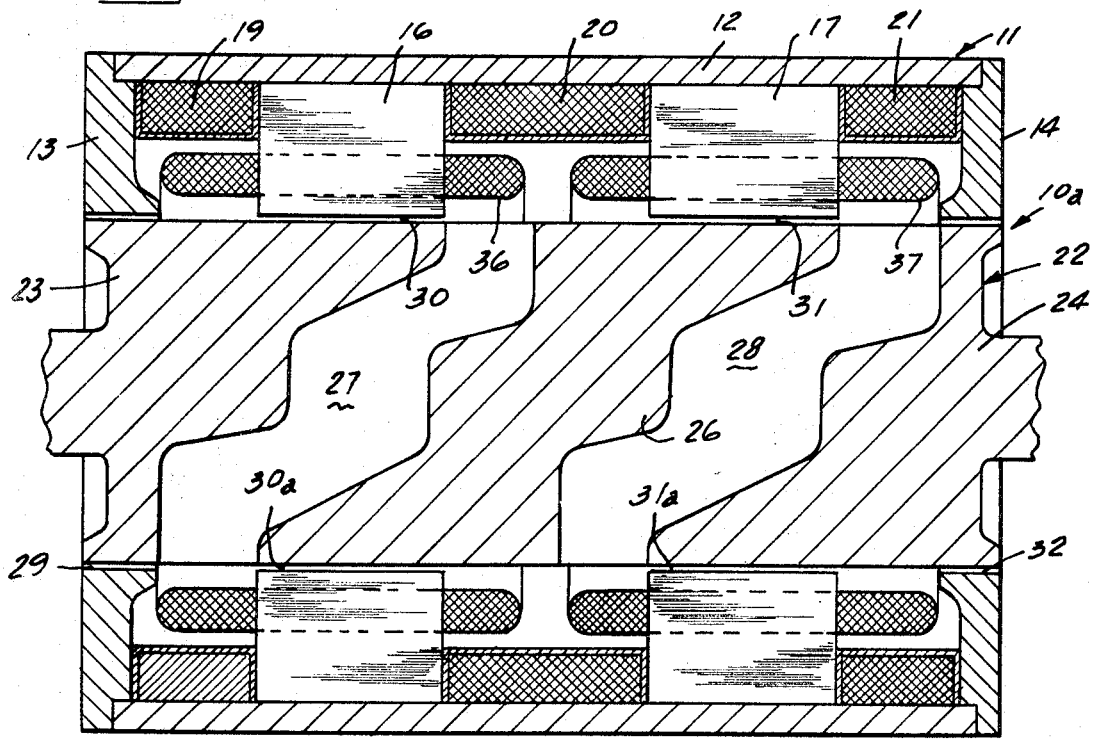
FIG. 4 is a modified construction of the alternator of FIG. 1.

Seen in FIG. 1 is a dual-section brushless alternator constructed in accordance with the principles of this invention and is designated generally by reference numeral 10. The alternator 10 includes a housing 11 which is formed by a cylindrical portion 12 and a pair of inwardly extending walls 13 and 14.

A polyphase stator 16 is secured to the interior of the housing 11 and extends radially inwardly a distance approximately equal to the end walls 13 and 14. A second polyphase stator 17 is secured to the interior of the housing 11 and extends radially inwardly, and is spaced axially from stator 16. A common AC winding is wrapped about the polyphase stators 16 and 17. Positioned within the housing 11 and between the end wall 13 and stator 16 is a DC excitation winding 19. Positioned between the stators 16 and 17 is a DC excitation winding 20. Also, there is a third excitation winding 21 positioned between the stator 17 and the end wall 14. DC excitation windings 19, 20 and 21 are energized to produce a magnetic flux through the magnetic circuit and generate an alternating current voltage in the winding 18.

Journaled for rotation within the housing 11 is a rotor 22 which is constructed of a plurality of magnetic portions separated by nonmagnetic portions. Particularly, the rotor 22 includes a pair of end portions 23 and 24 which are of magnetic material and have a plurality of extended fingerlike portions extending toward one another. A center portion 26 of magnetic material is positioned between the end members 23 and 24 and separated therefrom by a pair of nonmagnetic spacing elements 27 and 28. The center portion 26 has fingerlike extensions facing in opposite directions so as to be interleaved between the fingerlike extensions of the ends 23 and 24.

An annular parasitic airgap 29 is provided between the end wall 13 and the end member 23 of rotor 22. Similarly, an airgap 30 is provided between the stator 16 and the end portion 23 and center portion 26 of armature 22. The airgap 30 may consist of a plurality of airgaps, such as 30a defining a plurality of pole pieces for the polyphase stator. Similarly, an annular airgap 31 is provided between the stator 17 and the center portion 26 and end portion 24 of rotor 22. The stator 17 may define a plurality of airgaps, such as 31a. An annular parasitic airgap 32 is provided between the end wall 14 and the end member 24 of rotor 22.

FIGS. 2 and 3 more clearly depict the detailed construction of the rotor 22. FIG. 2 shows the end sections of the fingerlike extensions of the end member 24 and the center member 26. The nonmagnetic spacer 28 has a central core 28a with a plurality of radially extending portions 28b separating the fingerlike extensions of the magnetic members 26 and 24. The magnetic members 26 and 24 may be secured to the nonmagnetic member 28 by electron beam welding or other suitable means.

FIG. 3 shows a developed representation of the magnetic members 23, 24 and 26 together with the nonmagnetic spacers 27 and 28. The magnetic member 23 includes a plurality of fingerlike extensions 23a separated by grooves or valleys 23b. The center member 26 has fingerlike extensions 26a extending between the fingerlike extensions 23a and partially into the valley 23b. The center portion 26 also has fingerlike extensions 26c extending between fingerlike extensions 24a of the magnetic member 24. It will be noted that the fingerlike extensions 26b are disposed substantially between the fingerlike extensions 26c and extend in an opposite direction.

In operation, the magnetic flux produced by the excitation coils 19, 20 and 21 will travel axially in the cylindrical portion 12 of housing 11 and to the end plate 13. The magnetic flux then enters the annular parasitic gap 29 where the flux then travels axially into the poles or fingerlike extensions of the end section 23. The magnetic flux from the poles enter the stator 16 through the radial airgap 30. The flux then continues circumferentially around the back iron of the stator 16 and then enters radially across the gap 30a into the fingerlike extensions or poles of the center portion 26. The magnetic flux then travels axially through the center portion 26 and crosses the gap 31 and enters the stator 17. Here again the flux travels circumferentially around the back iron of the stator 17 and enters the fingerlike extensions of end member 24 through the gap 31a. The magnetic flux path is completed through the parasitic gap 32 between the end portion 24 and the end wall 14.

Accordingly, a dual-section brushless alternator constructed in accordance with the present invention provides the unique and novel advantages of producing double the power output at the same shaft speed and rotor stress levels, allows for operation of a driving turbine connected to the rotor at higher shaft speeds at the same alternator rotor stress levels, and reduces the weight considerably for the same rotor stress levels.

FIG. 4 shows a modified form of a brushless alternator constructed in accordance with the present invention. The alternator of FIG. 4 is designated generally by reference numeral 10a. The alternator 10a includes a pair of separate AC windings 36 and 37 positioned about the stator 16 and 17 respectively. The operation of the magnetic flux path of alternator 10a is substantially the same as that of alternator 10, shown in FIG. 1. However, the alternator 10a provides means for obtaining very high DC output voltages as may be required for missile and space applications. By providing the separate AC windings 36 and 37 the alternator insulation problems are reduced as the voltage difference between various sections of the alternator are reduced.

Figure 5:
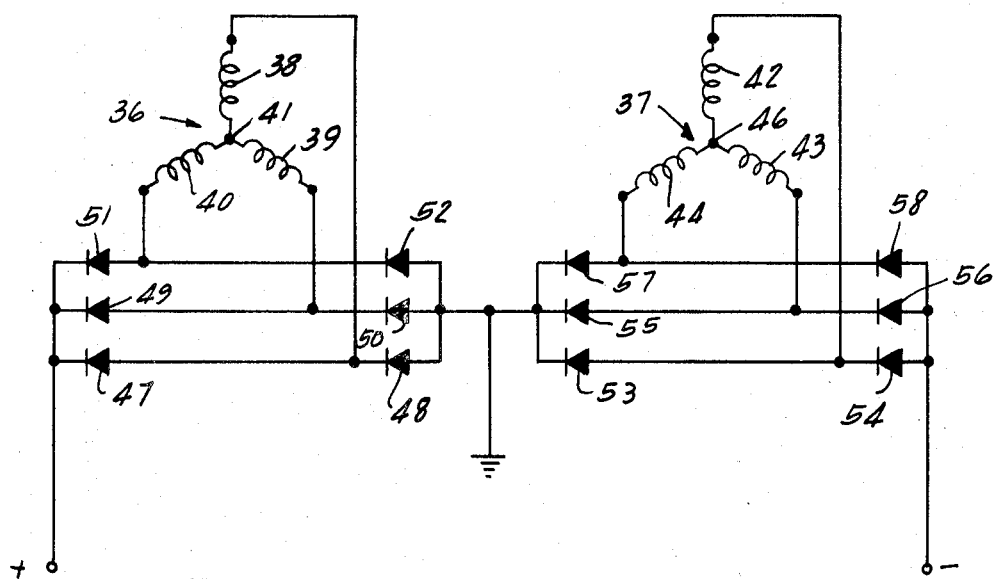
FIG. 5 is a schematic wiring diagram showing the connection of operating diodes for the operation of the alternator of FIG. 4.

Seen in FIG. 5 is a schematic diagram of the connections made between the two winding sections 36 and 37 of FIG. 4. Winding section 36 includes a plurality of windings 38, 39 and 40 arranged in a Y connection at circuit point 41. Similarly, the winding section 37 includes a plurality of windings 42, 43 and 44 arranged in a Y connection at circuit point 46. The winding 38, of section 36 is connected to the anode and cathode of a pair of diodes 47 and 48, while the winding 39 is connected to the anode and cathode of a pair of diodes 49 and 50. Similarly, winding 40 is connected to the anode and cathode of a pair of diodes 51 and 52. Diodes 47, 49 and 51 have their cathodes connected together and to a terminal for supplying a positive voltage thereto. The diodes 48, 50 and 52 are connected together and to ground potential.

Winding 42 of section 37 is connected to the anode and cathode of a pair of diodes 53 and 54 while winding 43 is connected to the anode and cathode of a pair of diodes 55 and 56. Similarly, winding 44 is connected to the anode and cathode of a pair of diodes 57 and 58. Diodes 53, 55 and 57 are connected together and to ground potential. Diodes 54, 56 and 58 are connected together and to a terminal for supplying negative voltage thereto. Therefore, it will be seen that winding section 36 has only half the voltage thereacross and winding 37 has the other half of the voltage thereby providing an output voltage across the output terminals which is twice that of the voltage across the windings.

Accordingly, the present invention provides a dual-section alternator having a rotor of increased mechanical strength when compared with conventional type alternators, and permits very high rotor speeds and allows higher alternator operating temperatures. Furthermore, the alternator of the present invention may be employed advantageously to obtain very high DC voltages without necessitating the use of corresponding high dielectric material insulating the various components of the alternator.

Although there is disclosed only the preferred embodiments of the present invention, it will be understood that variations and modifications may be effected without departing from the spirit and scope of the novel concepts of this invention.

I claim:

1. A brushless alternator comprising:

a. a housing having a cylindrical member of magnetic material and first and second end walls secured to said cylindrical member and extending radially inwardly therefrom;
b. first and second annular magnetic stator sections secured to the interior of said cylindrical member and having pole pieces extending radially inwardly a distance substantially equal to the extension of said first and second end walls;
c. coil means positioned about said first and second stator sections;
d. a rotor positioned within said housing and adjacent said first and second stator sections and arranged to provide parasitic airgaps between the surface of said rotor and said first and second end walls and to provide airgaps between the surface of said rotor and the pole pieces of said first and second stator sections;
e. said rotor comprising, first and second end members of magnetic material each having a plurality of fingerlike extensions extending axially toward one another, a center member of magnetic material having a plurality of fingerlike extensions extending axially toward said first and second end members and having the fingerlike extensions thereof interleaved between the fingerlike extensions of said first and second end members, a first nonmagnetic spacer positioned between said first end member and said center member to provide a nonmagnetic gap between the fingerlike extensions of said first end member and said center member, and a second nonmagnetic spacer positioned between said second end member and said center member to provide a nonmagnetic gap between the fingerlike extensions of said second end member and said center member;
f. means to produce a magnetic field within said housing, said magnetic field passing through said cylindrical member and said end walls of said housing and through the parasitic airgaps between the end walls and the rotor and the airgaps between the pole pieces of said stator sections and the rotor; and
g. said coil means comprising a common coil winding about said first and second stator sections.

2. A rotary machine comprising:

a. a housing having a cylindrical member of magnetic material and first and second end walls secured to said cylindrical member and extending radially inwardly therefrom;
b. first and second annular magnetic stator sections secured to the interior of said cylindrical member and extending radially inwardly therefrom; coil means positioned about said first and second stator sections;
c. a rotor positioned within said housing and adjacent said first and second stator sections and arranged to provide parasitic airgaps between the surface of said rotor and said first and second end walls and to provide airgaps between the surface of the rotor and said first and second stator sections;
d. said rotor comprising, first and second end members of magnetic material each having a plurality of fingerlike extensions extending axially toward one another, a center member of magnetic material having a plurality of fingerlike extensions extending axially toward said first and second end members and having the fingerlike extensions thereof interleaved between the fingerlike extensions of said first and second end members, a first nonmagnetic spacer positioned between said first end member and said center member to provide a nonmagnetic gap between the fingerlike extensions of said first end member and said center member, and a second nonmagnetic spacer positioned between said second end member and said center member to provide a nonmagnetic gap between the fingerlike extensions of said second end member and said center member; and
e. excitation means to produce a unidirectional magnetic field within said housing, said magnetic field passing through said cylindrical member and said end walls of said housing and through the parasitic airgaps between the end walls and the rotor and the airgaps between the stator sections and the rotor, said excitation means comprising a first excitation element located directly between the first end wall and the first stator section and having an outside diameter substantially corresponding to the outside diameter of the first stator section, and comprising a second excitation element located between the second stator section and the second end wall and having an outside diameter substantially equal to the outside diameter of the second stator section.

3. A rotary machine according to claim 2 with said coil means comprising a first coil positioned about said first stator section and a second coil positioned about said second stator section, first and second rectifier networks connected across the first and second coils respectively, said networks having respective first and second outputs for supplying respective first and second rectified potentials of predetermined polarity, and means connecting the first and second outputs in series aiding relation to provide a net direct current output potential equal to the sum of the first and second rectified potentials.

4. A rotary machine according to claim 2 with said excitation means comprising a first excitation winding directly between the first end wall and the first stator section, a second excitation winding directly between the first and second stator sections, and a third excitation winding directly between the second stator section and the second end wall, said first, second and third excitation windings having outside diameters substantially equal to the outside diameter of the first and second stator sections.

5. A rotary machine according to claim 4 with said coil means comprising first and second polyphase windings positioned on said first and second stator sections, respectively, first and second diode networks connected across the first and second polyphase windings, respectively, and having respective first and second outputs for supplying first and second rectified potentials of predetermined polarity, and means for connecting the first and second outputs in series aiding relation to provide a direct current output potential equal to the sum of the first and second rectified potentials.

6. A direct current generator comprising:
a. a housing having first and second annular stator sections disposed in spaced relation therein;
b. a rotor positioned within said housing and adjacent said first and second stator sections and arranged to provide airgaps between the surface of said rotor and said first and second stator sections, said rotor comprising first, second and third rotor members connected for joint rotation, said first and third rotor sections having polar extensions extending axially toward one another, the second rotor section being disposed between the first and third rotor sections and having a plurality of polar extensions extending toward said first and third rotor sections with a nonmagnetic gap between the polar extensions of the first and second rotor sections and between the second and third rotor sections, the adjacent polar extensions of the first and second rotor sections being in magnetic coupling relationship to the first stator section, and the adjacent polar extensions of the second and third rotor sections being in magnetic coupling relationship with the second stator section;
c. a first polyphase alternating current winding on the first stator section and a second polyphase alternating current winding on the second stator section;
d. rectifier networks connected across the first and second polyphase alternating current windings respectively, said networks having respective first and second outputs for supplying respective first and second rectified potentials of predetermined polarity; and
e. an electric circuit connecting the first and second rectifier networks to provide a resultant output potential equal to the sum of the first and second rectified potentials.